United States Patent [19]

Pierzchala et al.

[11] 3,769,443
[45] Oct. 30, 1973

[54] BURIED-TYPE SPLICE CASE
[75] Inventors: Chester E. Pierzchala, Wheaton; Milton A. Klayum, Wood Dale, both of Ill.
[73] Assignee: Reliable Electric Company, Franklin Park, Ill.
[22] Filed: Nov. 5, 1971
[21] Appl. No.: 196,024

[52] U.S. Cl............. 174/38, 174/51, 174/60, 174/76, 174/77 R, 174/78
[51] Int. Cl................................. H02g 9/02
[58] Field of Search......... 174/17 R, 37, 38, 174/51, 60, 65 SS, 71 R, 72 R, 76, 77 R, 78, 174/87, 91, 92, 93

[56] References Cited
UNITED STATES PATENTS

| 457,761 | 8/1891 | Dillon | 174/87 |
| 3,173,987 | 3/1965 | Potruch | 174/60 X |
| 3,431,349 | 3/1969 | Hamilton | 174/38 |
| 3,435,124 | 3/1969 | Channell | 174/38 |
| 3,518,358 | 6/1970 | Brown | 174/93 X |
| 3,557,299 | 1/1971 | Dienes | 174/38 |

FOREIGN PATENTS OR APPLICATIONS
890,206  9/1953  Germany .................... 174/60

*Primary Examiner*—Laramie E. Askin
*Attorney*—Roy H. Olson et al.

[57] ABSTRACT

A buried-type ready access splice closure comprises a dielectric base with a central opening for receiving the opposite runs of a loop of cable. The base contains clamping means for clamping the runs of the cable and for grounding the shield of the cable outside of the base. The loop of cable has its coverings stripped away to expose the insulated core wires for splicing to service wires. The loop is supported by a bracket that is attached to the base and to the clamping means, and the loop and bracket are enclosed by a cover that is removably clamped to the base. Additional openings are provided in the base for receiving the service wires which may be sealed to the base by a nut and bushing arrangement. The cable runs are sealed by potting compound in the central opening.

3 Claims, 12 Drawing Figures

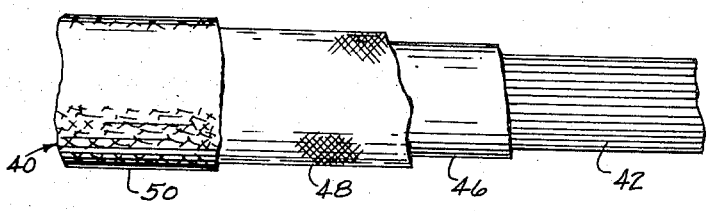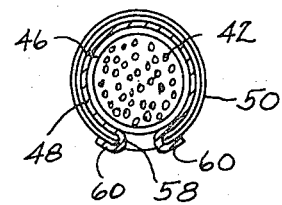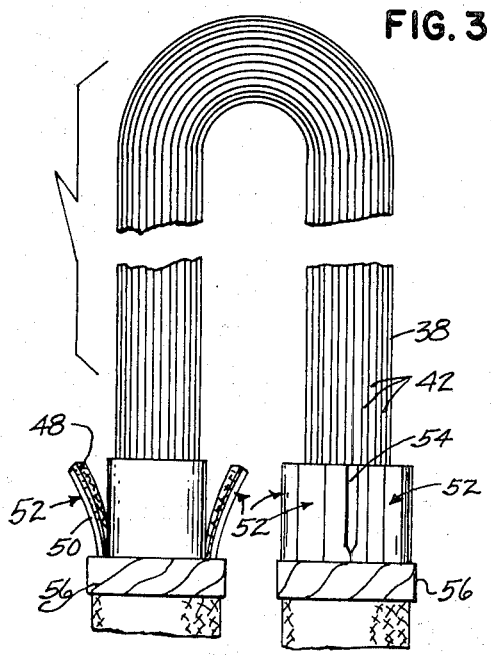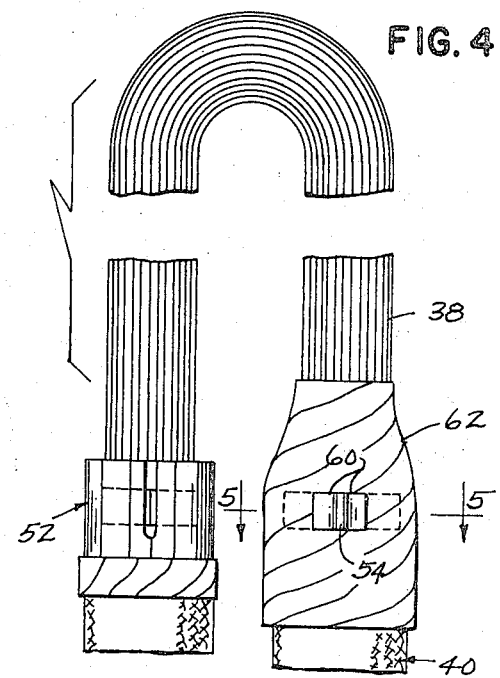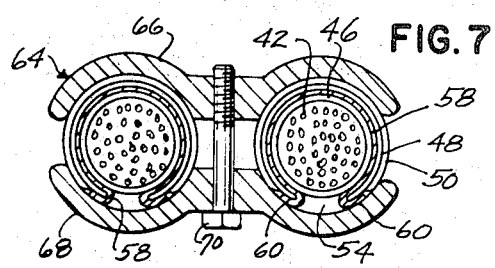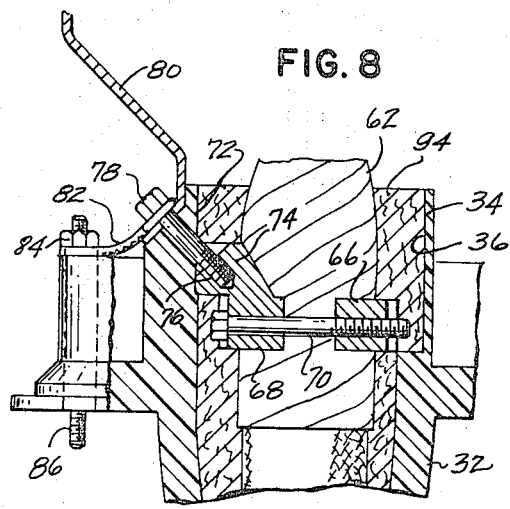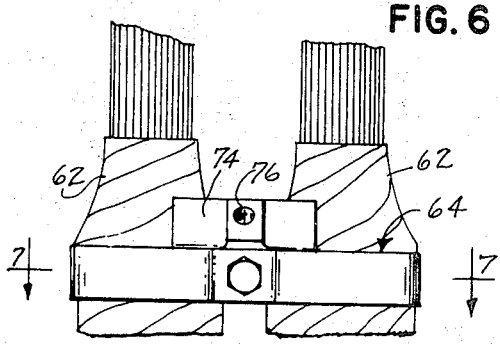

BURIED-TYPE SPLICE CASE

CROSS-REFERENCE TO RELATED APPLICATION

Reference may be had to our copending application Ser. No. 196,911, filed Nov. 9, 1971, entitled "Buried-Type Splice Case."

BACKGROUND OF THE INVENTION

This invention relates to buried-type splice cases for use in the distribution of service lines from a cable, particularly cables of the type used in the telephone industry.

In the use of underground telephone cables, it is a common practice to install above-ground splice cases that embody a splicing or tapping loop of cable at which the service wires are spliced to the wires of the main cable. In some areas it is often undesirable or impractical to have above-ground splice cases. Accordingly, the need arises for a splice case which is suitable for subterranean installation so that the main cable and service drops need not rise above the ground. However, a totally buried splice case should be of a construction which not only seals the splicing chamber from moisture and other contaminants, but also is one in which ready access may be had to the splicing chamber for addition or removal of service wires as the needs arise.

OBJECTS AND SUMMARY OF THE INVENTION

An object of the present invention is to provide a buried-type splice case for distributing service wires, the splice case having a ready accessibility for the purpose of disconnecting or extending service lines with a minimum of effort.

It is a further object of the present invention to provide a splice case of the type stated which is effectively sealed to prevent the entrance of moisture and other contaminants from entering the splicing chamber. The openings of the main cable are sealed by a potting compound, and the openings for the service wires are sealed by a nut and bushing arrangement. Moreover, the cover for the splicing chamber is not only sealed to the base of the unit but is capable of rapid removal as by a quickly detachable clamp ring.

A still further object of the present invention is to provide a splice case of the type stated in which an effective ground is provided for the cable shield and the shields of the service wires.

In accordance with the foregoing object the splice case comprises a dielectric base of moisture impervious material, the base having a central opening or passageway for receiving the opposite runs of a loop of cable of a type having a metallic grounding shield, an outer insulating sheath surrounding the grounding shield, an inner insulating sheath surrounded by the grounding shield and core wires surrounded by the inner insulating sheath. The base has mounted thereon an arrangement comprising an inner sheath clamp for engaging the inside surface of the grounding shield, and an outer sheath clamp for engaging the outer sheath and the inner sheath clamp whereby a conductive connection is established between the inner and outer sheath clamps. A bracket is attached to the base and is in conductive connection with the sheath clamps, and a grounding harness provides a ground connection to a grounding screw extending through the base for external connection to a ground wire. The bracket has an insulated end remote from the base for supporting the core wires of the loop at the turn of the loop so that the opposite lengths or runs of the core wires constitute a tapping or cable-splicing length that extends substantially from the base to the insulated end of the bracket and back again to the base. The base has tubular projections that form ports for receiving service wires to be spliced with the core wires. The bracket carries clamps for ground connections to the service wire shields. The main cable passageway in the base is adapted to receive a suitable potting compound to form a seal thereat. The service wire openings are suitably sealed by a nut and bushing structure on the tubular projections. Finally, a cover is removably and sealingly attached as by a clamp ring to the base.

BRIEF DESCRIPTION OF THE FIGURES

FIG. 2 is a fragmentary elevational view, partially broken away, of a main cable with which the splice case is used;

FIG. 3 is a fragmentary side elevational view showing a stage in the installation of the inner sheath clamp onto the cable;

FIG. 4 is a fragmentary side elevational view, similar to FIG. 3, and showing a further stage in the installation of the inner sheath clamp onto the cable;

FIG. 5 is a fragmentary sectional view taken along line 5—5 of FIG. 4;

FIG. 6 is a fragmentary side elevational view of a portion of FIG. 4 and showing a further assembly stage in which the outer sheath clamp is in place on the cable;

FIG. 7 is a fragmentary sectional view taken along line 7—7 of FIG. 6;

FIG. 8 is a fragmentary longitudinal sectional view taken approximately along line 8—8 of FIG. 1;

DETAILED DESCRIPTION

Figure 10:
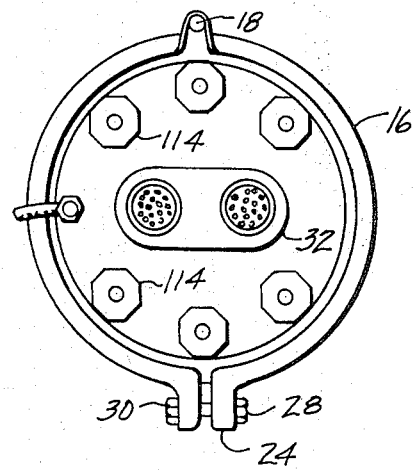
FIG. 10 is a view as seen from line 10—10 of FIG. 9.

Referring now in more detail to the drawings, there is shown a splice case 2 having a base 4 and a cover 6 which together define a splicing chamber 8. The base 4 is of a suitable dielectric, moisture impervious plastic having a surrounding cylindrical flange 10, which receives an 0-ring 12. The cover 6 is a cylindrical member of plastic or metal and includes at one end a surrounding conical flange 14, which telescopes with the inner axial end of the base 4 and which engages the 0-ring 12. The back side of the flange 10 is of a conical shape substantially companion to that of the flange 14. The base 4 and cover 6 are maintained in sealing but removable engagement by an articulated clamp ring 16 having generally semi-circular sections secured together at a hinge 18 (FIG. 10). The interior surfaces 20, of the clamp ring sections are generally conical in shape corresponding to the external shapes of the flanges 10, 14. The clamp ring 16 is shown open in FIG. 1, whereby the cover 6 may be withdrawn from or assembled with the base 4. When the clamp ring is closed, as in FIG. 10, the cover and base 4 are tightly sealed in end-to-end relationship. The free ends 22, 24 of the clamp ring sections are turned radially outwardly, and one of the ends 22 has a hole 26 for receiving a bolt 28 that is in the other section 24. A nut 30 that is threaded onto the bolt 28 draws the ends 22, 24 together, thereby forming a clamp and a seal at the O-ring 12.

Formed in the base 4 are central forward and rearward tubular sections 32, 34 which define an oval-shaped passageway 36. The opposite runs of a loop 38 of main cable 40, extend side-by-side through the passageway 36 such that the loop 38 extends beyond the base 4 and into the splicing chamber 8. The insulated core wires 42 of the loop 38 are exposed for splicing connection in the chamber 8 to paired service wires 44, as will presently be more fully described.

As best seen in FIG. 2, the cable 40 is usually of a type having an inner insulating sheath 46 surrounding the core wires 42 and a metallic grounding shield 48 surrounding the inner sheath 46. An outer insulating sheath 50 surrounds the grounding shield 48.

In preparing the cable for assembly with the base 4, enough cable slack should be left at the installation site to permit the cable to be raised out of the trench or hole in which the cable and splice case are to be buried. By allowing sufficient slack, as aforesaid, a normal amount of ground heaving will not tend to stress the cable when the assembled cable and splice case are buried. The work of assembly of the cable and splice case may be carried out on a suitable temporary platform.

Accordingly, at the work site, the inner sheath 46, grounding shield 48, and outer sheath 50 are stripped from the requisite length of splicing loop 38. Thereafter, suitable lengths of outer sheath 50 and grounding shield 48 are longitudinally slit to provide a series of tabs 52, as best shown in FIGS. 3 and 4. Two adjacent tabs 52 are also cut away to form a slot 54 for purposes presently more fully appearing. A wrap of tape 56 may be applied to each cable run at the ends or bases of the tabs 52.

Provided for cooperation with each cable run is an inner sheath clamp 58. The inner sheath clamp 58 surrounds the inner sheath 46 and is surrounded by the grounding shield 48 so as to be in electrical contact therewith. The tabs 52 may be folded back temporarily to permit the clamp 58 to be installed over the inner sheath 46. Also the outer surface of the clamp 58 may be roughened to enhance contact with the shield 48. Integrally formed on the inner sheath clamp 58 are ears 60, 60 which project through the slot 54 and are turned back for engagement with the outer sheath 50. Thus, the formation of the tabs 52 and the slot 54 permits installation of the inner sheath clamp 58 within the grounding shield 48 and allows the ears 60, 60 to be on the outside of the cable. The sheath clamp 58 is of a resilient material so that it may be opened up by pulling apart the ears 60 to permit the clamp 58 to be slipped over the inner sheath 46. A tape wrap 62 may be applied over the tabs 52, leaving the ears 60 exposed, as shown in FIG. 4. With tape wraps 62 on both runs of the cable loop, the base 4 may be placed over the cable loop as by inserting the loop through the passageway 36. However, at this stage of the installation the base 4 is positioned out of the way of the tape wraps 62 so as to provide access in the regions of the inner sheath clamps 58.

The splice case assembly also includes an outer sheath clamp structure 64 having a clamp 66 and a clamp bracket 68. The clamp 66 and the clamp bracket 68 cooperate to provide side-by-side recesses which surround the cable runs at the tape wraps 62 and with the ears 60 of the respective inner sheath clamps 58 engaging the inside surfaces of the clamp bracket 68, as best seen in FIG. 7. By this means an electrical connection is established from the grounding shield 48 to the clamp structure 64. A bolt 70 passes through the bracket 68 and is threaded into the clamp 66 for drawing the clamp 66 and bracket 68 together tightly around the runs of the cable and to insure a firm mechanical and electrical engagement of the ears 60 with the bracket 68.

Figure 9:
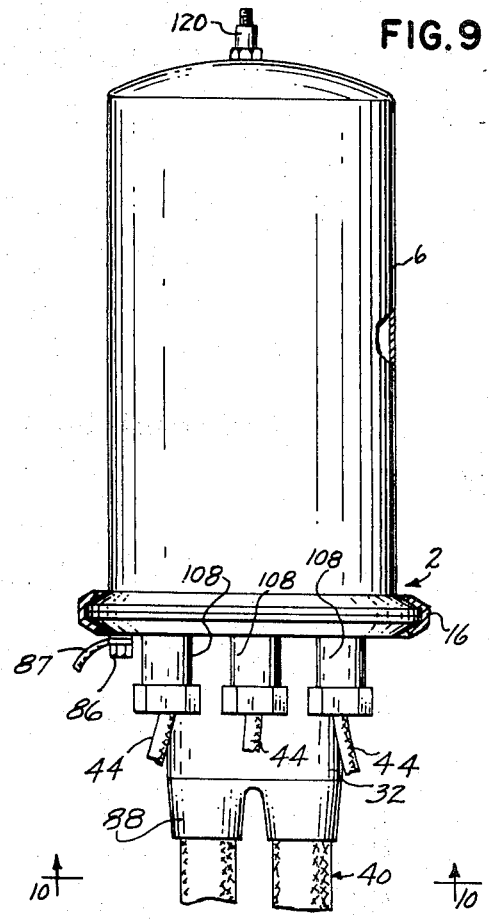
FIG. 9 is a side elevational view of the splice case with the cable and service wires installed and with the cover being mounted on the base.

With the clamp structure 64 installed on the cable, the base 4 may be shifted so that the outer sheath clamp structure 64 telescopes within the passageway 36 and is adjacent to a boss 72 that is integrally formed on the base 4 on the outside of the base section 34. The outer sheath clamp bracket 68 is also provided with an enlarged extension or flange 74 having a threaded hole 76 (FIGS. 6 and 8) for receiving a bolt 78 by which the outer sheath clamp structure 64 may be rigidly secured to the base 4. The bolt 78 also serves to secure a mounting bracket 80 and a grounding harness 82 (FIG. 8) to the base 4. The grounding harness 82 is connected to a ground terminal 84 which comprises a screw 86 projecting through the base at one side of the base section for connection to ground wire 87 (FIG. 9) in a known manner. Thus, a ground connection is provided from the metallic mounting bracket 80 and from the shield 48 through to the ground terminal screw 86 and wire 87.

A resilient, rubber-like cable grommet 88 is fitted over the two runs of the cable and has a portion 90 (FIG. 1) thereof that telescopes within the base section 32. The portion 90 has a recess 92 which receives a companion-shaped inwardly projecting bead on the base section 32. The grommet 88 may be split in order that it may be inserted onto the two runs of the cable. However, after installing the grommet, any openings between the cable and the grommet may be sealed with a suitable tape.

With the base 4 upright, as in FIG. 8, a suitable potting compound 94 may be introduced into the passageway 36 through the upper end thereof. The passageway 36 is, in effect, a chamber that is closed off at its lower end by the grommet 88. The potting compound may, for example, be a curable polyurethane resin. The potting compound 94 substantially encapsulates the cable runs in the region of the inner and outer sheath clamps, leaving the exposed splicing loop 38 for closure by the cover 8.

Figure 1:
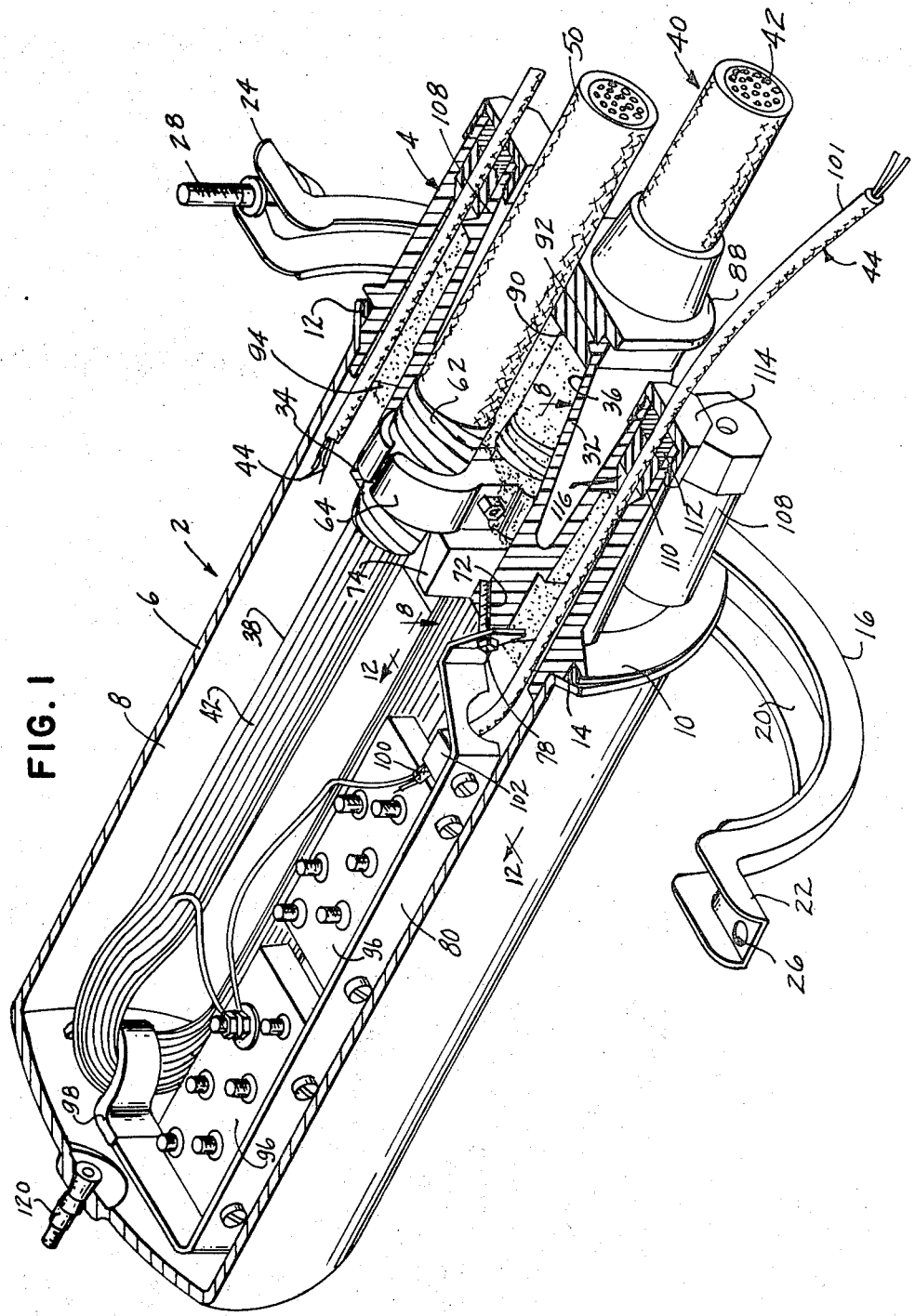
FIG. 1 is a cut-away fragmentary perspective view of a splice case constructed in accordance with and embodying the present invention.

The bracket 80 may be a generally C-shaped member having one or more dielectric terminal boards 96 secured thereto, as seen in FIG. 1. The end of the bracket 80 that is remote from the base 4 has an outwardly opening U-shaped portion 98 that is covered with an insulating material and which receives and supports the core wires of the cable loop 38. Consequently, when the cover 6 is removed, the cable loop 38 and terminal boards 96 remain in place and are accessible for connecting or disconnecting the service wire pairs 44. In general, a selected pair of core wires from the loop 38 are connected to a pair of terminals on one of the terminal boards 96. The service wire pair is then electrically connected to those terminals to complete the service wire connection to the cable. Loading coils or other devices may be mounted on the terminal boards, as desired. Of course, the service wires may be directly spliced to the cable core wires, bypassing the terminal boards, if desired.

Figure 11:
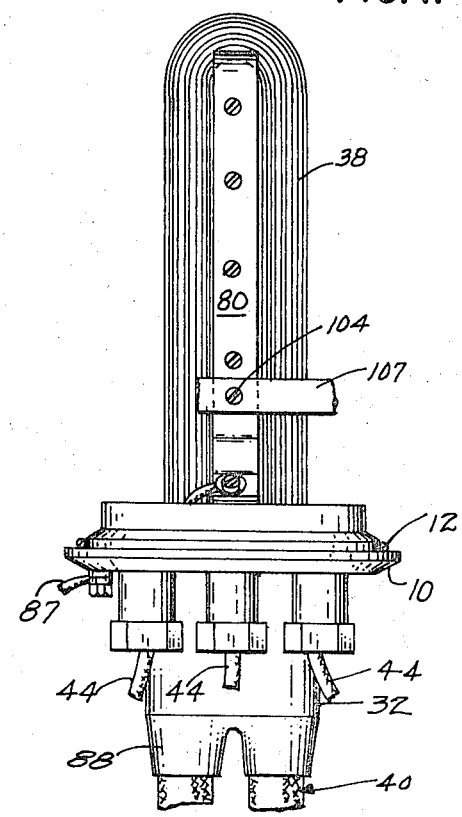
FIG. 11 is a view similar to FIG. 9 but showing the cover removed.
Figure 12:
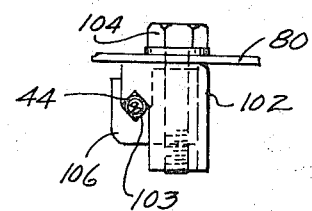
FIG. 12 is a fragmentary sectional view taken approximately along line 12—12 of FIG. 1.

Each service wire pair 44 contains the individually insulated wires with a metallic grounding shield 100 (FIG. 1) surrounding the wire pair and a plastic insulating sheath 101 surrounding the metallic shield 100. This outer insulating sheath 101 may be stripped away over a short length in order to expose the shield 100 so that the service wire pair may be grounded through the mounting bracket 80. For this purpose, the mounting bracket has a grounding block 102 (FIGS. 1 and 12) secured thereto as by screw 104. Screw 104 is also threaded into a movable block 106 which cooperates with the block 102 to form a generally rectangular opening 103 at which the grounding shield 100 is clamped. Additional service wire grounding assemblies like that shown in FIG. 12 may be provided for in any suitable manner on the bracket 80 for each pair of service wires. This may be done by mounting a cross strap 107 (shown in FIG. 11) which may be arcuate in configuration when viewed along the longitudinal center line of the base 4.

Integrally formed on the base are tubular circumferentially disposed projections 108, there being six such projections shown in the present form of the invention. Each projection provides a port for receiving a pair of service wires 44; however, these tubular projections may be closed off and sealed when not in use. When a service wire pair 44 extends through a tubular projection 108, the service wire pair will also extend through aligned openings in a sealing bushing 110, a spacer 112, and a gland nut 114, the latter being threaded onto the outer end of the projection 108. The bore of the tubular projection 108 includes a conical portion 116 so that upon tightening of the nut 114, the spacer 112 applies pressure to the bushing 110 forcing the latter against the conical surface 116. This causes the bushing to grip the outer sheath of the service wire pair and form a seal. If a tubular projection 108 is not is use, it may be sealed off by an imperforate bushing and an imperforate disc. Normally potting compound is not introduced into the projections 108 in the region adjacent to the bushing 110 although this may be done if desired.

The splice case assembly may be used pressurized or unpressurized. In the former situation, gas is introduced into the splicing chamber 8 through a valve 120 in the cover 6. Gas pressure is, of course, applied only after the cover 6 has been sealingly clamped in place.

The invention is claimed as follows:

1. A buried-type splice case comprising a dielectric base of moisture impervious material, said base having a passageway means receiving the opposite runs of a loop of cable having a metallic grounding shield, an outer insulating sheath surrounding the grounding shield, an inner insulating sheath surrounded by the grounding shield, and core wires surrounded by the inner insulating sheath; inner sheath clamping means engaging the inside of said grounding shield, outer sheath clamping means engaging said outer sheath and said inner sheath clamping means, said outer sheath clamping means including opposed members and means drawing said member together to bring the outer and inner sheath clamping means into conductive contact, means securing said outer sheath clamping means to said base, said securing means providing a connection for grounding said shield through said outer sheath clamping means, a bracket attached to said securing means in conductive connection therewith, said bracket having an end remote from said base supporting the core wires of the loop of the cable at the turn of the loop so that opposite runs of the core wires constitute a cable-splicing length that extends substantially from said base to said bracket end and back to said base, said base having openings receiving service wires for splicing with said core wires of the cable-splicing length, said service wires having a grounding shield, means forming a ground connection between the service wire grounding shield and said bracket, means for sealing said passageway means and said openings to render said base moisture impervious, said sealing means including a potting compound that completely encapsulates the cable runs in the region of the inner and outer sheath clamping means, and a cover removably and sealingly attached to said base and enclosing said cable-splicing length and said service wires in a splicing chamber.

2. A buried-type splice case according to claim 1 in which said cover and base have cooperating surrounding flanges, sealing means is disposed between said flanges, and there is a detachable clamp engaging said flanges to seal the cover to said base.

3. A buried-type splice case according to claim 1 including means in said base providing a ground connection from the cable through the base.

* * * * *